TELEPHONE RECEIVER WITH BAND ELIMINATION CHARACTERISTIC

Filed June 28, 1966 Sheet 1 of 2

INVENTOR.
K. KOBARA
BY
Hopgood & Calimafde
ATTORNEYS

INVENTOR.
K. KOBARA
BY
Hopgood & Calimafde
ATTORNEYS

United States Patent Office 3,452,164

Patented June 24, 1969

3,452,164

TELEPHONE RECEIVER WITH BAND ELIMINATION CHARACTERISTIC

Kiyoshi Kobara, Tokyo, Japan, assignor to Nippon Electric Company, Limited, Tokyo, Japan, a corporation of Japan Filed June 28, 1966, Ser. No. 561,173
Claims priority, application Japan, Sept. 16, 1965, 40/56,801
Int. Cl. H04r *17/02, 9/10*
U.S. Cl. 179—115 2 Claims This invention relates to a telephone receiver of the electromagnetic type and in particular to the frequency characteristics thereof.

Conventional telephone receivers of the foregoing type are designed for use within the normal frequency bandwidth of a telephone line. They exhibit an almost flat frequency characteristic (sensitivity) between 200 c./s. and 3400 c./s., and little attention is paid to the frequency region above 3400 c./s. In this region the frequency response gradually descends at the rate of 12 db./octave. Since normal telephone signals, and signals transmitted through carrier channels, do not contain any substantial frequency component above 3400 c./s., the sensitivity drop above 3400 c./s. does not present any practical problem.

Where the telephonic communication involves time division multiplex transmission and, for example, pulse code modulation channels, the system includes means for sampling the telephone signals at a specific frequency, and consideration must be given to the frequency response characteristics of the telephone reeciver above the 3400 c./s. range. According to conventional theory, the sampling in the time division multiplex transmission channel is usually performed at 8 kc., a frequency at least twice as large as the upper frequency limit of the telephone signals (3400 c./s.). Where the channel equipment does not contain a filter having good attenuation characteristics to reject the 8 kc./s. component, that component appears in the telephone signal and arrives at the receiving end where it will be heard. Because of the high cost of a filter having good band attenuation characteristics, it becomes prohibitive to attach such a filter to each receiver.

Accordingly, it is the object of the present invention to substantially reject the sampling frequency component at the receiver without the necessity for such an additional filter.

It is a feature of this invention that the receiver is constructed with a response characteristic containing an attenuation pole at the sampling frequency. In other words, the telephone receiver has the same frequency response characteristics as a conventional telephone receiver in the range between 200–3400 c./s., but has band elimination characteristics in the vicinity of the sampling frequency, 8 kc./s. It can therefore be used both with telephone channels containing a sampling means, and also the common telephone channel, which does not include any sampling means. Since an additional filter of particularly good characteristics, for eliminating the sampling frequency component, is not necessary, the equipment can be realized at moderate cost.

The above mentioned and other features and objects of this invention and the manner of attaining them will become more apparent and the invention itself will best be understood by reference to the following description of an embodiment of the invention taken in conjunction with the accompanying drawings wherein.

Figure 1:
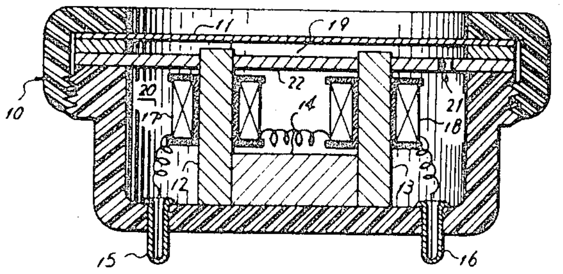
Fig. 1 (prior art)
FIG. 1 is a longitudinal cross-sectional view of a conventional telephone receiver.

Referring now to FIG. 1, a conventional telephone receiver is shown containing a vessel 10 of insulating material, such as Bakelite; a paramagnetic diaphragm 11; magnetic pole pieces 12 and 13, spaced apart from the diaphragm 11; a permanent magnet 14, which is intimately attached to the pole pieces to polarize the diaphragm 11; and driving coils 17 and 18 which are attached to the pole pieces 12 and 13, respectively, in order to give mechanical oscillation to the diaphragm in response to telepehone signals supplied from input terminals 15 and 16. The telephone receiver further comprises a rigid plate 22 which forms a first cavity 19, with the diaphragm 11, and a second cavity 20 with the vessel 10. The plate 22 has an aperture 21, so that the telephone receiver has an almost flat frequency characteristic over the necessary frequency range.

Figure 2:
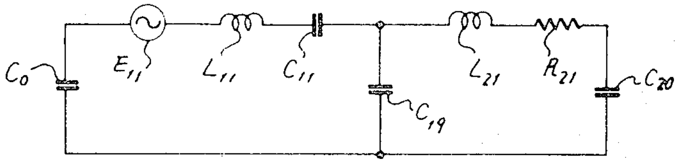
Fig. 2 (prior art)
FIG. 2 is the electrical equivalent circuit of the receiver shown in FIG. 1.
Figure 3:
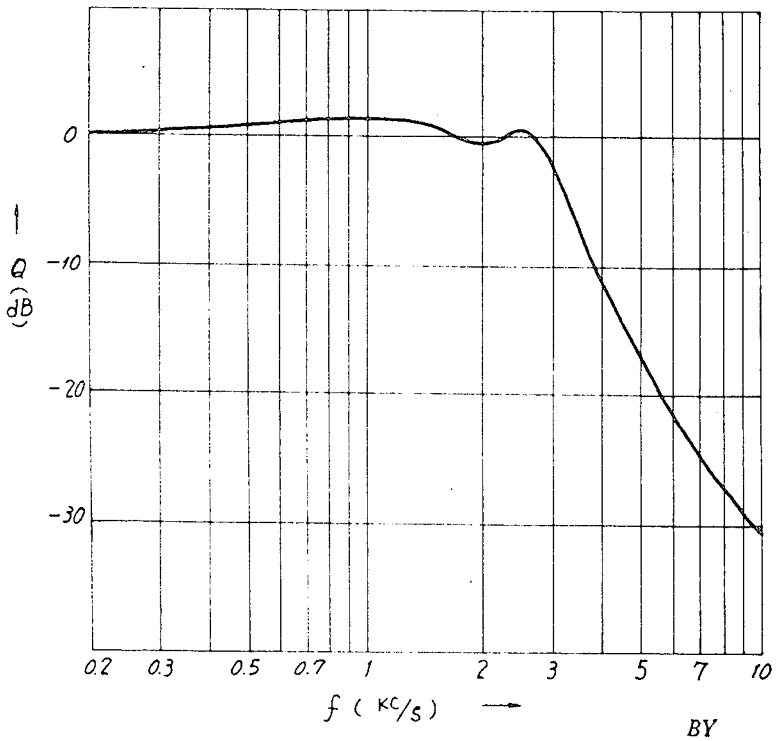
Fig. 3 (prior art)
FIG. 3 shows graphically the frequency characteristics of the conventional telephone receiver.

FIG. 2 shows the electrical equivalent circuit of the oscillating system of the conventional telephone receiver of FIG. 1. This circuit is described in detail in "Dynamical Analogies," H. F. Olson, D. Van Nostrand Co., Inc., New York, 1943, pp. 20–23, and in "Acoustical Engineering," by the same author and publisher, 1957, p. 344. Briefly, the equivalent circuit is composed of: a series circuit consisting of an inductance $L_{11}$ and capacitance $C_{11}$ corresponding respectively to the effective mass and compliance of the diaphragm 11; a circuit connected to said series circuit in parallel, consisting of a capacitance $C_{19}$, corresponding to the compliance of the cavity 19, and the serial connection of an inductance element $L_{21}$ and an resistance element $R_{21}$ corresponding respectively to the effective mass and effective resistance of the aperture 21, and a capacitance $C_{20}$, corresponding to the compliance of the cavity 20; and a capacitance $C_0$ serially connected to said series circuit and corresponding to the effective compliance of an ear cavity formed between the subscriber's auricle and the vessel 10. The equivalent circuit is driven by an oscillating power source $E_{11}$ which corresponds to the energy source of the mechanical oscillation of the diaphragm 11. The sensitivity of the receiver depends on the acoustic pressure in the ear cavity which in turn depends upon the oscillating force of the diaphragm 11, and consequently on the quantity of the electric charge passing through the series circuit consisting of the inductance element $L_{11}$ and the capacitance element $C_{11}$. This latter quantity of course depends upon the values of the inductance element $L_{11}$, the capacitance element $C_{11}$ and the frequency of the oscillating power source $E_{11}$. Assuming that the effective mass and the effective compliance of the diaphram 11 are 0.56 gram and $1.89 \times 10^{-8}$ cm./dyne, respectively, the effective compliance of the cavity 19 is $1.23 \times 10^{-8}$ cm./dyne, the effective mass and the effective resistance of the aperture 21 are 0.42 gram and $6.53 \times 10^{3}$ mechanical ohms, respectively, and the effective compliance of the cavity 20 is $6.24 \times 10^{-8}$ cm./dyne, the resulting frequency characteristics of the telephone receiver is that shown in FIG. 3.

The frequency characteristics of the conventional telephone receiver displays a gradual descending slope from approximately 3000 c./s. which is in the neighborhood of the upper limit for normal telephone signals. As may be seen from FIG. 3 when used with time division multiplex, the adverse effect due to the leakage of the sampling frequency component cannot be avoided because of the relatively high sensitivity at 8 kc./s.

In order to achieve an attenuation pole in the vicinity of the sampling frequency of 8 kc./s., resort is had to the electrical analogy. According to circuit theory, this kind of attenuation pole is realized by changing the part including the capacitance element $C_{19}$ in the equivalent circuit of FIG. 2 into a pi-type circuit. According to the present invention, this pi-type circuit of the equivalent circuit is constructed mechanically at a moderate cost.

Figure 4:
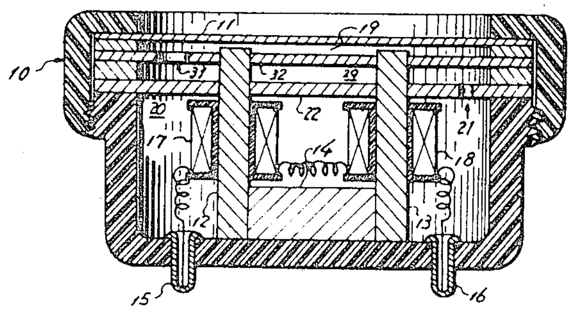
FIG. 4 is a longitudinal cross-sectional view of a telephone receiver according to the present invention.
Figure 5:
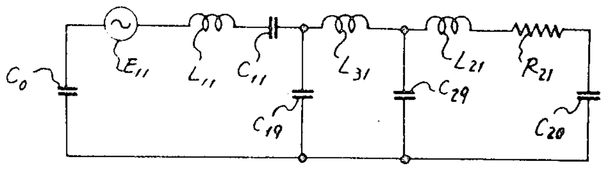
FIG. 5 is the equivalent circuit of the receiver of FIG. 4.
Figure 6:
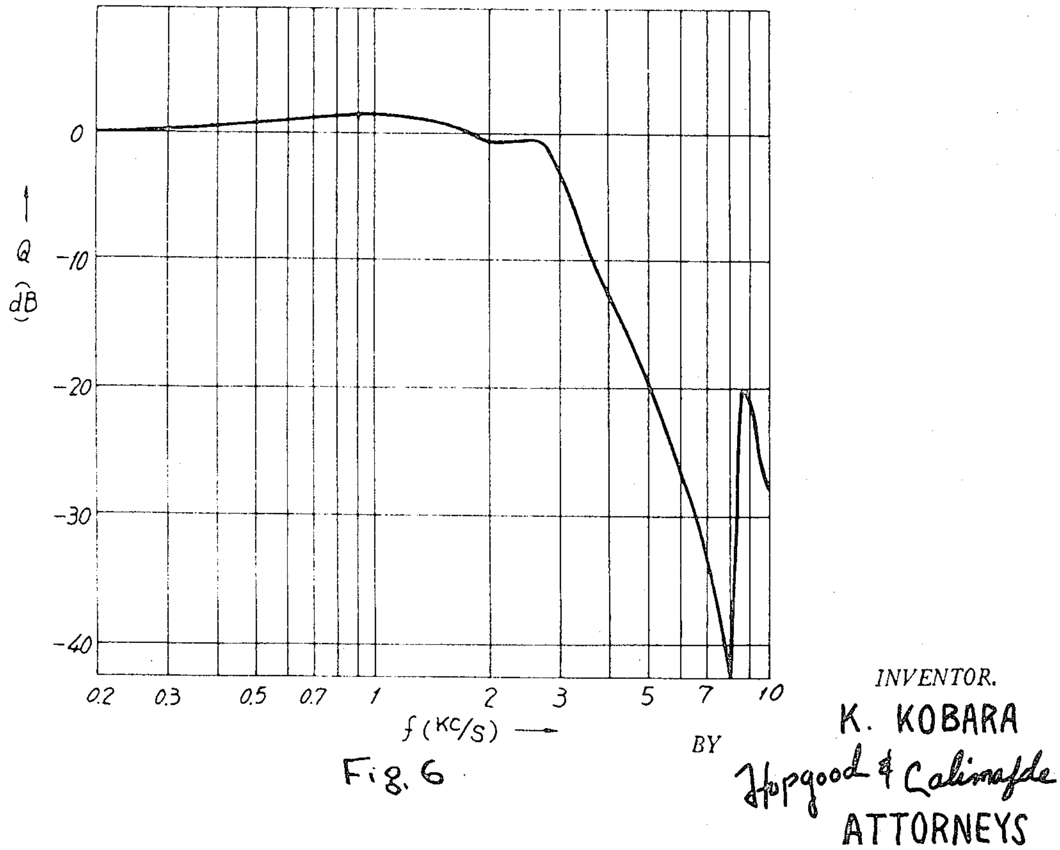
FIG. 6 shows graphically the frequency characteristics of the telephone receiver according to the invention.

Referring now to FIG. 4, where the same reference numerals are used to designate the same elements as in FIG. 1, the telephone receiver according to the present invention comprises another plate 32 disposed in the cavity 19 (of FIG. 1) so that a second cavity 29 is constituted, which is coupled with the cavity 19 by way of an aperture 31 in the plate 32. Taking the effect of these cavities, plates and apertures into consideration, the equivalent circuit of the oscillation system obtained is shown in FIG. 5. The pi-type circuit is composed of the capacitance $C_{19}$, an inductance element $L_{31}$ corresponding to the effective mass of the aperture 31, and a capacitance element $C_{29}$ corresponding to the effective compliance of the cavity 29. The cavity formed by the plate 32 (having the aperture 31) provides the pi-type circuit which consists of said elements $L_{31}$, $C_{19}$, and $C_{29}$. Thus the desired attenuation pole is easily realized. For example, assuming that the effective mass and the effective compliance of the diaphragm 11 is 0.56 gram and $1.89\times10^{-8}$ cm./dyne, respectively, the effective compliance of the cavity 19 is $0.565\times10^{-8}$ cm./dyne, the effective mass of the aperture 21 is 0.112 gram, the effective compliance of the cavity 29 is $1.04\times10^{-8}$ cm./dyne, the effective mass and the effective resistance of the aperture 31 is 0.308 gram and $5.44\times10^{3}$ mechanical ohms, respectively, and the effective compliance of the cavity 20 is $6.24\times10^{-8}$ cm./dyne, the frequency characteristics have the attenuation pole in the vicinity of 8 kc./s. shown in FIG. 6.

To measure the frequency characteristics of the devices of FIGS. 1 and 4, the open side of the vessel 10 was covered by a member so as to constitute a pseudo-ear cavity corresponding to an ear cavity formed between the subscriber's auricle and the vessel 10.

While the principles of the invention have been described in connection with specific apparatus, it is to be clearly understood that this description is made only by way of example and not as a limitation to the scope of the invention as set forth in the objects thereof and in the accompanying claims.

I claim:

1. A telephone receiver having at least one attenuation pole at a predetermined frequency comprising: a vessel of insulating material; a diaphragm disposed across the mouth of said vessel; means in said vessel for oscillating said diaphragm in response to a supplied signal; first plate means disposed internally of said diaphragm and constituting therewith a first cavity; and second plate means disposed internally of said first plate means and constituting therewith a second cavity and with said vessel a third cavity; each of said first and second plate means including apertures for respectively coupling said first and said second cavities and said second and said third cavities.

2. The receiver claimed in claim 1 wherein said diaphragm and said first and second plates are in parallel tandem and each comprises a planar disc conforming in shape to the internal vessel configuration.

No references cited.

KATHLEEN H. CLAFFY, *Primary Examiner.*

ARTHUR A. McGILL, *Assistant Examiner.*